Patented Feb. 3, 1942

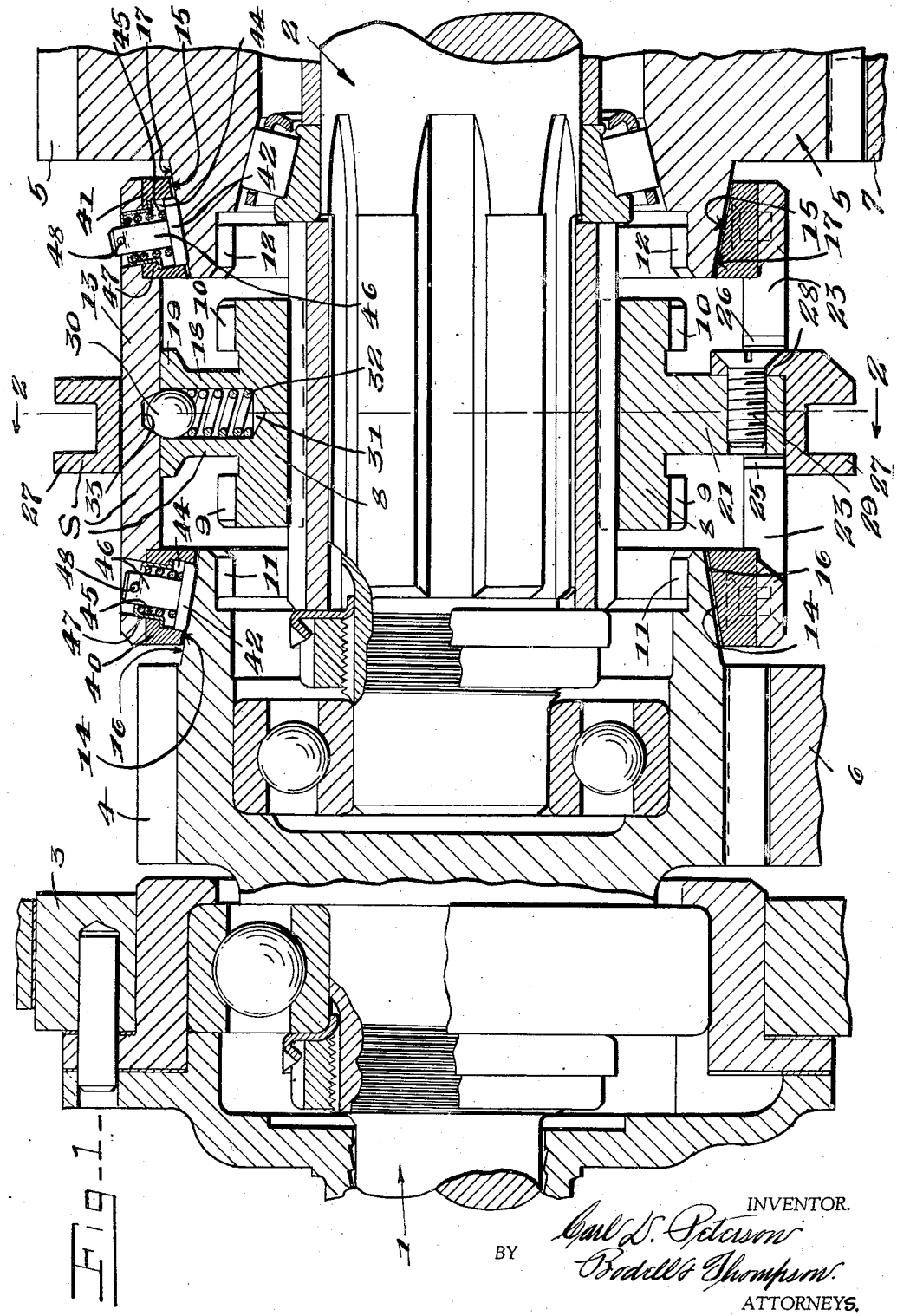

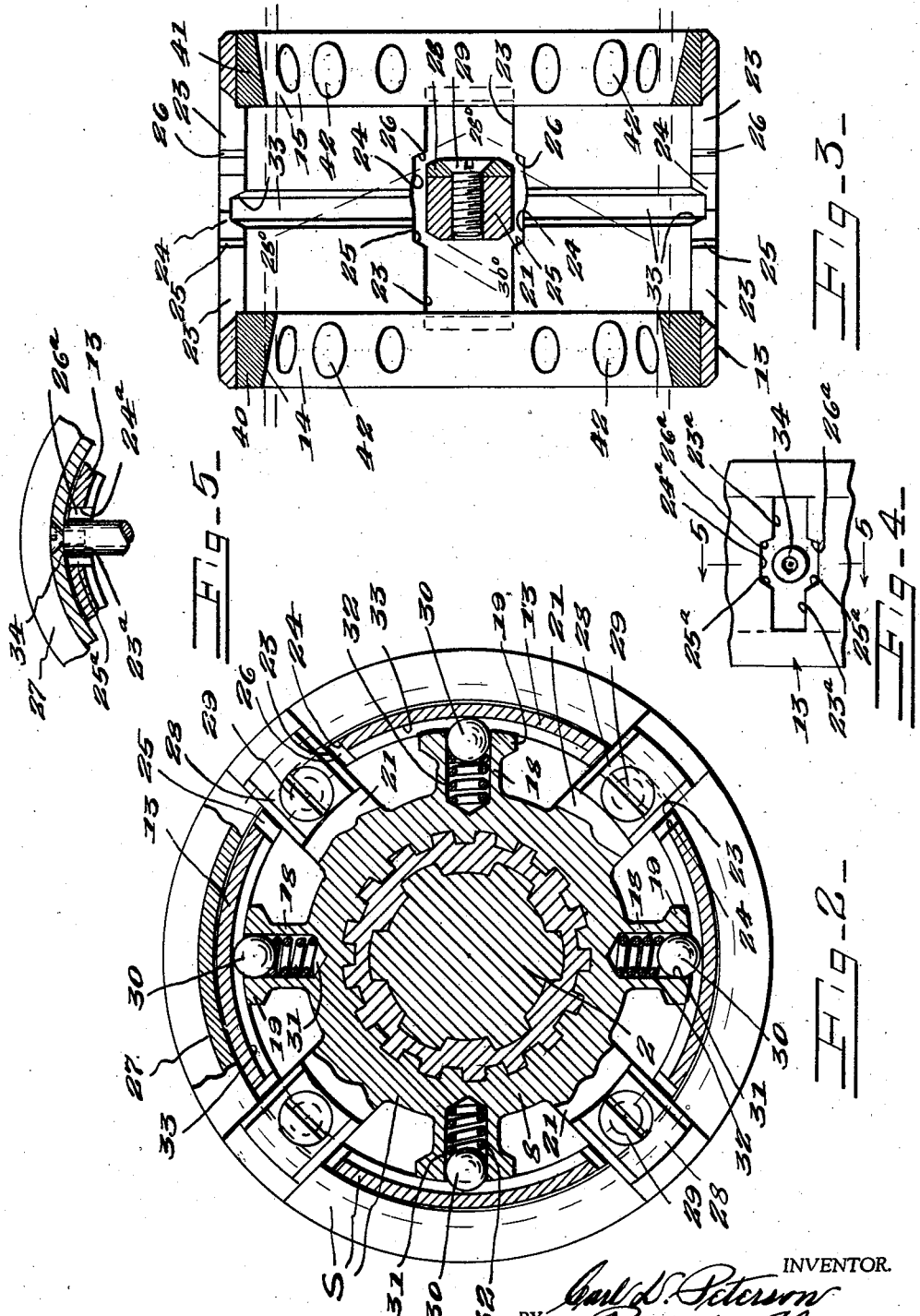

2,271,571

UNITED STATES PATENT OFFICE 2,271,571

SYNCHRONIZING CLUTCH

Carl D. Peterson, Toledo, Ohio

Application April 6, 1939, Serial No. 266,361

8 Claims. (Cl. 192—53)

This invention relates to synchronizing clutches including friction and toothed clutch faces of the type operable in opposite directions from neutral to connect driving and driven shafts or elements through two different gear ratios, as in direct drive relation and indirect drive relation through a train of gears, and also of the type in which axial shifting-in of toothed clutch faces is blocked until the speeds are synchronized and then permitted by relative rotary movement of the toothed and friction faces which releases the blocking out effect, and has for its object a clutch construction in which the shifting-in force to engage toothed clutch faces is restrained until synchronization is established and then the shifting-in operation effected upon synchronization with minimum force or effort for the selected gear ratio.

It further has for its object posts on the inner clutch member coacting with lengthwise slots in the outer section, which slots have notches at opposite sides of their intermediate portions, each of the notches being unsymmetrical or having their end walls of different inclinations for coacting with the posts cam fashion, the different inclinations causing the shift to be made with minimum effort in either direction.

It further has for its object a synchronizing clutch in which one or the other of the friction faces to be engaged is provided with yielding means to engage the other friction face preliminary to the friction face coming into full engagement.

It further has for its object a construction of the inner section of one of the members of the clutch, by which a large bearing surface is provided for the inner face of the sleeve section intermediate the ends of the sleeve section, in order to support and center the sleeve section, in contradistinction to supporting the sleeve or inner toothed section with considerable looseness or play, and relying on the friction faces at the ends of the sleeve to center the sleeve.

The invention consists in the novel features and in the combinations and constructions hereinafter set forth and claimed.

In describing this invention, reference is had to the accompanying drawings in which like characters designate corresponding parts in all the views.

Figure 1 is a sectional view of this synchronizing clutch, the contiguous part of a transmission gearing being also shown.

Figure 2 is a sectional view on line 2—2, Figure 1.

Figure 3 is a longitudinal sectional view of the sleeve section, one of the cam posts of the inner section being also shown in section.

Figure 4 is a fragmentary plan view of the sleeve section showing a different form of slot and post from that shown in Figures 1 and 2.

Figure 5 is a sectional view on line 5—5, Figure 4.

In synchronizing clutches, which shift in opposite directions from neutral, to connect the driven shaft to the gearing through one gear ratio when shifted in one direction from neutral and in another gear ratio when shifted in the opposite direction from neutral, the same actuating force has heretofore been necessary to effect synchronization in both ratios and complete the clutch engagement in either ratio. One of the features of the invention is a construction by which a minimum force is necessary for each of the two gear ratios or a minimium force for dislodging the spring-pressed plunger upon synchronization when the shift is made to the left from neutral and to aline the cam posts with the slots of the sleeve or friction section, and another different minimum force to dislodge the plungers from the notches and to aline the cam posts with the slots, when the shift is made to the right from neutral.

I designates a drive shaft and 2 the driven or transmission shaft of a change speed transmission gearing, the shaft I being mounted in suitable bearings in the wall of the gear box 3, and the transmission or driven shaft being mounted in a pilot bearing in a clutch member, as a gear 4 on the shaft I within the gear box, and also in a bearing, not shown, in the gear box. 5 is a clutch member, as a gear on the shaft 2 and normally rotatable about the same. The gears 4 and 5 mesh with gears 6 and 7 on a countershaft in the usual manner. The shaft I with the gear 4 thereon and the gear 5 constitute driving members through different gear ratios for the shaft. The shaft I is connected to a prime mover, as an internal combustion engine, through the usual engine clutch or its equivalent.

The synchronizing clutch operates to connect the shafts I, 2 in direct drive relation when shifted in one direction from neutral, and in an indirect drive relation through the gears 4, 6, 7, 5 when shifted in the opposite direction from neutral.

8 designates the inner section of the synchronizing clutch member designated generally S, the section 8 being splined on the driven shaft 2 and having toothed or jaw clutch faces 9, 10 on opposite sides thereof shiftable into engagement with toothed or jaw clutch faces 11, 12 provided respectively on the clutch members or gears 4 and 5.

13 designates the outer or friction section of the synchronizing clutch, this having friction faces at 14 and 15 for coacting with complemental friction faces 16 and 17 on the gears 4 and 5 respectively. The section 13 is in the form of a sleeve, and the friction faces 14 and 15 are provided at opposite ends of the sleeve. These friction faces 14 or 15 are arranged to engage the friction faces 16 or 17 in advance of the engagement of the clutch teeth 9 with the clutch teeth 11 or the clutch teeth 10 with the clutch teeth 12 and effect synchronization. The inner clutch section 8 is here shown as formed with radial posts 18 having enlarged heads 19, the outer faces of which are arc-shaped to conform to the curve of the inner face of the sleeve section 13 and provide a large bearing surface for supporting and centering radially the sleeve 13 between the ends of the sleeve and preventing undue axial misalinement of the sleeve. By reason of the large bearing surfaces on the posts 18, the friction section or sleeve 13 is centered radially instead of being centered by the friction faces 14 and 15 on the complemental friction faces of the gears 4 and 5. Hence, by this construction, the sleeve slidably fits the bearing surfaces on the heads 19 of the radial post 18 with very little, if any, clearance. The inner section 8 is also provided with radially extending cam posts 21 alternating with the posts 18 and extending through lengthwise slots 23 in the sleeve, each of these slots 23 having notches 24 on opposite sides of its intermediate portion, which notches are formed unsymmetrical or with their walls 25 and 26 of different inclination for coacting with the posts 21. The posts 21 slidingly fit the slots 23 but are of less width than the slots plus the depth of the notches 24, and hence permit a relative rotary movement of the inner section 8, and the sleeve section 13, for a purpose to be presently described. The inner toothed section is connected to a shifting collar 27 encircling the sleeve section 13 and slidable on the same, and as here shown, the collar is formed with lugs 28 lapping the posts 21 and secured thereto, as by screws 29. The lugs 28 are, as shown in Figure 3, the same width as the posts and when assembled are substantially a part of the post.

The sections 8 and 13 are coupled together to initially shift as a unit and to permit shifting of the inner section 8 axially relatively to the sleeve section 13, when one or the other of the friction faces 14, 15 engages with the friction face 16, or 17 of the gear 4 or 5 and effects synchronization of the shafts 1 and 2 or of the gear 5 and shaft 2. This yielding means is shown as spring-pressed plungers or balls 30 arranged in axial recesses 31 in the posts 18, the balls being pressed by the springs 32 into the notches 33 in the inner face of the sleeve section 13. These notches are V-shaped or truncated with the opposing walls inclined in opposite directions and serve to accurately and definitely center the sleeve 13 without any play in an axial direction. These notches are portions of an internal circumferential groove so formed for convenience in manufacture. The inclination of the side walls of the groove and also the force of the springs 32 determine the amount of shifting force to be applied to the section 8 to dislodge the balls or poppets 30 from the notches to permit the section 8 to be shifted relatively to the section or sleeve 13 or the notches and springs are so correlated as to establish a predetermined or fixed synchronized snap pressure. The snap pressure is the pressure required to shift the clutch section 8, and hence snap the balls 30 out of the notches or groove 33. For hand shifted synchronizing clutches, this snap pressure may be from fifteen to twenty pounds, and for power shifted clutches from one hundred to one hundred fifty pounds. By determining or fixing the amount of snap pressure in any clutch, the variables left to use for good synchronization lie in the slope or angle of the end walls of the notches in the sleeve or friction section in which cam posts work and diameters of the conical friction surfaces of the sleeve 8, as will be hereinafter pointed out. These elements may be varied in accordance with the synchronization requirements for the different speed ratios. As best seen in Figure 3, one friction surface, as 15, at one end of the sleeve 8 having to take care of the greater mass or weight during synchronization is of greater diameter than the friction face 14 on the opposite end of the sleeve 8.

When the inner section 8 is shifted in one direction or the other from neutral by force applied from a shifting mechanism or lever through the collar 27, the sleeve is carried along as a unit therewith, due to the engagement of the spring-pressed plungers 30 in the notches 33. When the friction face 14 or 15 of the sleeve comes into full engagement with the friction face 16 or 17 of the gear 4 or 5, it begins to synchronize the speed of the gear 4 and shaft 2 or the gear 5 and the shaft 2, and at the beginning of such frictional engagement before the speeds are synchronized, the spring-pressed plungers 42 cause the sleeve section 13 to be rotated relatively to the toothed section 8, bringing the cam posts 21 into one or the other of the notches 24, so that further axial shifting of the inner section 8 is blocked by reason of the engagement of the posts 21 at the corner of one side thereof with the end faces 25 or 26 of the slots 24. The spring-pressed plungers 30 are still engaged in the notches 33. The springs acting on the plungers or balls 30 are of such strength, and the walls of the notches 33 of such inclination that the shifting of the toothed section 9 relative to the friction section or sleeve 14, or the pressure required to effect such shifting, is determined by the spring load on the poppets or balls 0 and the inclination of the side walls of the notches 30, and also the cam angles 25, 26 of the notches 24 and the angles of the corners of the cam posts. The spring-pressed poppet load may be varied to suit conditions, as to whether the clutch is hand operated or power operated. When the speeds are synchronized, there is no longer any differential rotative force applied to the friction section 13, and hence continued pressure on the collar 27 will cause the corners of the cam posts 21 to act cam fashion on the end faces 25 or 26 of the notches 24 and center or aline the cam posts 21 with the slots 23, so that the cam posts may be shifted into the slots to engage the clutch teeth 9 with the clutch teeth 11 or clutch teeth 10 with the clutch teeth 12. The different ratios cause the force required to accomplish this to be different, and in order that this force may be the maximum required for the shift, the slots 24 are unsymmetrical or made with their end faces of different inclination, as for instance, the cam face 26 is arranged at a 28° angle and the cam face 25 is at a 30° angle.

As seen in Figure 4, instead of a square cam post, the post may have a cylindrical end or pin 34 in the slot 23a and the notches 24a may be unsymmetrical and the opposite ends thereof as walls 25a and 26a of different angles. The pins serve to couple the toothed section to the shifting collar 27, as seen in Figure 5.

The friction faces 14, 15, and 16, 17, are conical and provided on rings 40 and 41 fitted in recesses or secured in the ends of the sleeve section 13, these friction faces being of bronze or any other suitable metal. In order to initially and quickly engage the friction section 13 with the clutch face 16 or 17 upon slight initial shifting movement of the sleeve section 13, each friction face 14 and 15 is provided with yieldingly pressed shoes or plungers 42 which extend slightly beyond the face 14 or 15 and engage the face 16 or 17 in advance of the engagement of the face 14 or 15 therewith and which are pressed into the plane of said faces 14 or 15, as the friction section 13 is pressed into its final completely engaged position. As here shown, these shoes or plungers 42 are shown as spring-pressed and as located in recesses or bores 44 in the ring 40 or 41 and pressing inwardly in a radial direction by springs 45 encircling stems 46 on the plungers and thrusting in opposite directions against the plungers and the bottom of the seats or thimbles 47 arranged in the bores. The stems extend through the bottoms of the thimbles and the shoes or plungers are held from outward displacement by a locking member, as a pin 48, extending through the outer end of each stem and bearing on the outer face of the bottom of each thimble 47. This also is one means for holding the shoes or plungers off from the friction face 16 or 17 when the clutch member is in neutral position.

Due to the unsymmetrical formation, the synchronizing clutch may be readily adapted to situations where different pressures in opposite directions are necessary to effect synchronization through either one of the two gear ratios, due to the different inclinations of the end walls 25 and 26, of the slots 23, different pressures will be required when the speeds are synchronized to center the cam posts with the slots 23. These inclinations may be so determined for the particular installation that the required shifting pressure is applied to effect synchronization before the plungers 30 may be dislodged from the notches 33 and before the cam posts 21 may center or aline with the slots 23 by reason of the cam engagement with the cam surfaces 25, 26 of the notches 24.

More axial pressure on the friction section or sleeve 13 is required when the clutch S is shifted to the right into indirect drive position than when it is shifted to the right into direct drive position. Hence, the left end wall 25 of the slot 24 is of greater angularity (30°) than the right end wall 26 (28°).

These features also enable the same synchronizer to be used for hand and power shifts, as the only change necessary for the interchangeability is the relative angularity of the end walls 25, 26 of the notches 24. Hence, having once determined or standardized the relative angularity of the walls of the notches 33 and of the notches 24 for certain installations, it is only necessary to adapt the clutch for hand or power shifting to the end walls of the notches 24 to the proper inclinations.

What I claim is:

1. A double synchronizing clutch member shiftable axially in opposite directions from neutral to establish drives through different gear ratios including an inner section having toothed clutch faces on opposite sides thereof for coacting with toothed clutch faces of members into engagement with which the shiftable member is operated, an outer friction section having friction faces for coacting with complemental friction faces of the members into engagement with which the shiftable member is operated, and means connected to the inner section for shifting it, the friction faces of the sleeve section being arranged to engage the friction faces of said members in advance of the engagement of the toothed faces, means for connecting the sections to transfer the axial shifting movement of the inner section to the outer section and for controlling the movement of the inner section relatively to the outer section when the speeds of the shiftable member and the member into which the outer friction face has been shifted have been synchronized through the friction section, and for blocking axial movement of the inner section and the outer section until the speeds are synchronized, said connecting and controlling means including cam parts coacting to permit such relative movement of the inner member with different actuating pressures applied to the inner section for the two ratios and with a minimum pressure for each ratio.

2. A double synchronizing clutch member shiftable axially in opposite directions from neutral including an inner section having toothed clutch on opposite sides thereof for coacting with toothed clutch faces of members into engagement with which the shiftable member is operable, and an outer sleeve section having friction faces at the ends of the sleeve formation for coacting with complemental friction faces of the members into engagement with which the shiftable member is operable, the friction faces of the sleeve section being arranged to engage the friction faces of said members in advance of the engagement of the toothed faces, the inner section being formed with radial posts and the sleeve section with lengthwise slots having notches on opposite sides of its central portion for receiving the posts, the sides of the notches and the corners of the posts coacting cam fashion, the sides of each notch being inclined at different angles and the corresponding sides of the notches being of substantially the same inclination for the purpose set forth.

3. A double synchronizing clutch member shiftable axially in opposite directions from neutral including an inner section having toothed clutch faces on opposite sides thereof for coacting with toothed clutches faces of members into engagement with which the shiftable member is operable, and an outer sleeve section having friction faces at the ends of the sleeve formation for coacting with complemental friction faces of the members into engagement with which the shiftable member is operable, the friction faces of the sleeve section being arranged to engage the friction faces of said members in advance of the engagement of the toothed faces, spring-pressed plungers on one section coacting with notches in the other section, the notches having engaging faces on opposite sides thereof of equal inclinations for coacting with the plungers for the purpose set forth, the inner section being formed with radial posts and the sleeve section with lengthwise slots for receiving the posts, the slots having notches on opposite sides of its central portions, the sides of the notches and the corners of the posts coacting cam fashion, the sides of each notch being inclined at different angles and the corresponding sides of the notches being of substantially the same inclination for the purpose set forth.

4. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being complementally conoidal and arranged to engage in advance of the toothed clutch faces upon axial shifting of the shiftable member, and one of said members being formed with recesses opening through its friction face, shoes arranged in said recesses and normally projecting beyond the friction face of the member on which said shoes are provided, the shoes being formed with stems, a spring seat located in the recesses through which the stems extend, springs interposed between the spring seat and the head and the shoes and means for limiting the outward thrust of the shoes by the spring.

5. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being complementally conoidal and arranged to engage in advance of the toothed clutch faces upon axial shifting of the shiftable member, and one of said members being formed with recesses opening through its friction face, shoes arranged in said recesses and normally projecting beyond the friction face of the member on which said shoes are provided, the shoes being formed with stems, a spring seat located in the recesses through which the stems extend, springs interposed between the spring seat and the head and the shoes and means for limiting the outward thrust of the shoes by the spring, the last means being carried by the stem and coacting with the spring seat.

6. A synchronizing clutch comprising driving and driven clutch members, one of which is shiftable axially into and out of engagement with the other, each of said members having a toothed clutch face for coacting with the toothed clutch face of the other member, and a friction face for coacting with the friction face of the other member, the friction faces being arranged to engage in advance of the toothed faces upon axial shifting-in movement of the shiftable member, one of said members including an inner section formed with said toothed clutch face, and an outer section in the form of a sleeve slidable on the inner section and provided with the friction face, means for normally holding the sleeve from sliding movement relatively to the inner section and the inner section being formed with radial posts having enlarged heads forming a bearing surface for the sleeve with minimum clearance holding and centering the sleeve.

7. A synchronizing clutch comprising driving and driven clutch members, one of which is shiftable axially into and out of engagement with the other, each of said members having a toothed clutch face for coacting with the complemental toothed clutch face of the other member, and a friction face for coacting with the friction face of the other member, the friction faces being arranged to engage in advance of the toothed faces upon axial shifting movement of the shiftable member, one of said members including an inner section formed with said toothed clutch face and having radially extending posts formed with heads at their outer ends, and the outer section being a sleeve bearing on said heads, the heads supporting and centering the sleeve with minimum clearance, means carried by the posts and coacting with the sleeve for normally restraining relative axial movement of the sleeve and the toothed section.

8. A synchronizing clutch member shiftable axially in opposite directions from neutral and including inner and outer sections, the inner section having toothed clutch faces on opposite sides thereof, and the outer section having friction clutch faces on opposite sides thereof for coacting with one or the other of the two members to be clutched together in advance of the engagement of the toothed clutch face of said member and the toothed clutch face of the inner section, means for normally yieldingly holding the clutch sections from relative axial movement until one or the other of the friction faces is shifted into clutching engagement, the friction face at one end of the sleeve being of greater diameter than the other, for the purpose set forth, the sleeve having lengthwise slots, notches on opposite sides of its intermediate portion of the slots, and the inner section having radial posts normally arranged in the notches and being substantially the same width as the slots, each of said notches having its end walls of different inclinations for coacting cam-fashion with the posts.

CARL D. PETERSON.